(12) United States Patent
Arvidson et al.

(10) Patent No.: US 7,994,074 B1
(45) Date of Patent: Aug. 9, 2011

(54) COMPOSITE BALLISTIC FABRIC STRUCTURES

(75) Inventors: Brian D. Arvidson, Chester, VA (US);
Henry G. Ardiff, Chesterfield, VA (US);
Ashok Bhatnagar, Richmond, VA (US);
David A. Hurst, Richmond, VA (US);
Lori L. Wagner, Richmond, VA (US)

(73) Assignee: Honeywell International, Inc., Morristown, NJ (US)

( * ) Notice: Subject to any disclaimer, the term of this patent is extended or adjusted under 35 U.S.C. 154(b) by 1175 days.

(21) Appl. No.: 11/726,068

(22) Filed: Mar. 21, 2007

(51) Int. Cl.
*B32B 27/04* (2006.01)

(52) U.S. Cl. ............ 442/134; 2/2.5; 428/105; 428/911; 89/36.05

(58) Field of Classification Search ...... 2/2.5; 89/36.01, 89/36.02, 36.05; 428/102, 112, 902, 908.8, 428/911; 442/135, 239, 241, 246, 247, 248, 442/255, 263, 265, 266, 268, 269, 271, 277, 442/286, 326, 394
See application file for complete search history.

(56) References Cited

U.S. PATENT DOCUMENTS

| | | | |
|---|---|---|---|
| 3,671,542 A | 6/1972 | Kwolek et al. | 524/157 |
| 3,975,487 A | 8/1976 | Cottis et al. | 264/210.6 |
| 4,118,372 A | 10/1978 | Schaefen | 528/190 |
| 4,137,394 A | 1/1979 | Meihuizen et al. | 528/100 |
| 4,161,470 A | 7/1979 | Calundann | 524/599 |
| 4,356,138 A | 10/1982 | Kavesh et al. | 264/164 |
| 4,413,110 A | 11/1983 | Kavesh et al. | 526/348.1 |
| 4,430,383 A | 2/1984 | Smith et al. | 428/364 |
| 4,436,689 A | 3/1984 | Smith et al. | 264/204 |
| 4,440,711 A | 4/1984 | Kwon et al. | 264/185 |
| 4,457,985 A | 7/1984 | Harpell et al. | 428/224 |
| 4,535,027 A | 8/1985 | Kobashi et al. | 428/364 |
| 4,536,438 A | 8/1985 | Bishop et al. | |
| 4,536,536 A | 8/1985 | Kavesh et al. | 524/462 |
| 4,545,950 A | 10/1985 | Motooka et al. | 264/210.6 |
| 4,551,296 A | 11/1985 | Kavesh et al. | 264/203 |
| 4,599,267 A | 7/1986 | Kwon et al. | 428/364 |
| 4,612,148 A | 9/1986 | Motooka et al. | 264/49 |
| 4,617,233 A | 10/1986 | Ohta et al. | 428/364 |
| 4,663,101 A | 5/1987 | Kavesh et al. | 264/178 F |
| 5,246,657 A | 9/1993 | Yagi et al. | 264/210.6 |
| 5,286,435 A | 2/1994 | Slukster et al. | 264/205 |
| 5,286,833 A | 2/1994 | Bubeck et al. | 528/183 |
| 5,296,185 A | 3/1994 | Chau et al. | 264/205 |
| 5,342,567 A | 8/1994 | Chen et al. | 264/203 |
| 5,356,584 A | 10/1994 | Bubeck et al. | 264/205 |
| 5,395,671 A * | 3/1995 | Coppage et al. | 428/102 |
| 5,534,205 A | 7/1996 | Faley et al. | 264/103 |
| 5,552,208 A | 9/1996 | Lin et al. | 428/113 |
| 5,578,374 A | 11/1996 | Dunbar et al. | 428/364 |
| 5,674,969 A | 10/1997 | Sikkema et al. | 528/183 |
| 5,702,657 A | 12/1997 | Yoshida et al. | 264/112 |
| 5,724,670 A * | 3/1998 | Price | 2/2.5 |
| 5,736,244 A | 4/1998 | Kavesh et al. | 428/364 |
| 5,741,451 A | 4/1998 | Dunbar et al. | 264/103 |
| 5,939,553 A | 8/1999 | Reichwein et al. | 546/250 |
| 5,945,537 A | 8/1999 | Sikkema | 546/307 |
| 5,958,582 A | 9/1999 | Dunbar et al. | 428/364 |
| 5,972,498 A | 10/1999 | Kavesh et al. | 428/364 |
| 6,000,055 A * | 12/1999 | Citterio | 2/2.5 |
| 6,040,050 A | 3/2000 | Kitagawa et al. | 428/364 |
| 6,040,478 A | 3/2000 | Sikkema et al. | 562/424 |
| 6,119,575 A | 9/2000 | Dragone et al. | |
| 6,448,359 B1 | 9/2002 | Kavesh | 526/352 |
| 6,642,159 B1 | 11/2003 | Bhatnagar et al. | 442/134 |
| 7,148,162 B2 * | 12/2006 | Park et al. | 442/134 |
| 7,601,416 B2 * | 10/2009 | Palley | 428/171 |
| 2005/0093200 A1 | 5/2005 | Tam et al. | 264/211.14 |
| 2008/0075933 A1 * | 3/2008 | Rovers | 428/196 |

FOREIGN PATENT DOCUMENTS

| | | |
|---|---|---|
| WO | WO9921697 | 5/1999 |
| WO | WO2005090072 | 9/2005 |
| WO | WO2006012485 | 11/2006 |

* cited by examiner

*Primary Examiner* — Arti Singh-Pandey

(57) ABSTRACT

A multilayered composite fabric which comprises (a) a first fabric comprising non-woven unidirectionally oriented fibers in a first resin matrix, the fibers comprising high tenacity fibers, the first fabric comprising first and second surfaces; and (b) a second fabric comprising multi-directionally oriented fibers optionally in a second resin matrix, the second fabric also comprising high tenacity fibers, the second fabric having first and second surfaces, the first surface of the second fabric being bonded to the second to surface of the first fabric thereby forming the composite fabric. Also described is a method of making such fabric wherein the second fabric layer is used as a support during the manufacturing process and is thereafter consolidated into a single structure with the first fabric layer.

23 Claims, No Drawings

COMPOSITE BALLISTIC FABRIC STRUCTURES

BACKGROUND OF THE INVENTION

1. Field of the Invention

This invention relates to composite materials which are useful for ballistic and other applications, and to methods for their manufacture.

2. Description of the Related Art

Ballistic resistant products are known in the art. They may be of the flexible or rigid type. Many of these products are based on high tenacity fibers, and are used in such applications as body armor, such as bullet-resistant vests.

One popular type of ballistic resistant product is made from unidirectionally oriented high tenacity fibers, such as high tenacity polyethylene fibers or aramid fibers. Such products have desirable ballistic resistant properties, but require complicated manufacturing processes. As a result, they are usually more costly to manufacture than other types of ballistic resistant composites.

It would be desirable to provide a ballistic resistant product that included unidirectionally oriented fibers but could be produced in a more economical manner, as well as a process for making such product.

SUMMARY OF THE INVENTION

In accordance with this invention, there is provided a multilayered composite fabric, the composite fabric comprising:

(a) a first fabric comprising non-woven unidirectionally oriented fibers in a first resin matrix, the fibers comprising high tenacity fibers, the first fabric comprising first and second surfaces; and (b) a second fabric comprising multi-directionally oriented fibers optionally in a second resin matrix, the second fabric comprising high tenacity fibers, the second fabric having first and second surfaces, the first surface of the second fabric being bonded to the second surface of the first fabric thereby forming the composite fabric.

Further in accordance with this invention, there is provided in a method of forming a composite fabric structure from high tenacity fibers, the improvement comprising:

(a) forming a first fabric comprising non-woven unidirectionally oriented fibers, the fibers comprising high tenacity fibers;

(b) supporting the first fabric with a second fabric comprising multi-directionally oriented fibers, the second fabric comprising high tenacity fibers;

(c) coating a first matrix resin onto the first fabric either before, after or while the first fabric is supported by the second fabric, such that the matrix resin extends from the first fabric and at least into the second fabric, and (d) consolidating the first fabric and the second fabric into a composite fabric such that the first fabric and the second fabric are bonded together by means of the matrix resin, whereby the second fabric becomes an integral part of the composite fabric.

Further in accordance with this invention, there is provided a method of forming a composite fabric structure, the method comprising:

(a) supplying a first fabric comprising non-woven unidirectionally oriented fibers in a first resin matrix, the fibers comprising high tenacity fibers, the first fabric comprising first and second surfaces;

(b) supplying a second fabric comprising multi-directionally oriented fibers optionally in a second resin matrix, the second fabric comprising high tenacity fibers, the second fabric having first and second surfaces; and (c) bonding the first surface of the second fabric to the second surface of the first fabric to thereby form the composite fabric.

In addition to the two fabric layers, other fabric or non-fabric layers may be present. For example, there may be a three layered structure in which both outer layers are either the unidirectionally oriented fiber layers or the outer layers are the multi-directionally oriented fiber layers. In addition, four layer structures may be provided in which the outer layers are both the unidirectionally oriented fiber layers and the inner layers are both the multi-directionally oriented fiber layers. If the second fabric comprises a second matrix resin, preferably it is chemically the same as the first matrix resin for ease of manufacturability and uniformity.

The present invention provides a multilayered composite material that has excellent ballistic properties. In addition, this material can be made by using as the supporting structure for the unidirectionally oriented fiber a layer of or layers of multi-directionally oriented fabric, such as a woven fabric. The latter fabric becomes an integral part of the composite material and therefore reduce the cost of manufacture since there is less waste. Additionally, the quality of the material is enhanced by having the supporting layer become an integral part of the composite material.

DETAILED DESCRIPTION OF THE INVENTION

The present invention comprises a multilayered composite fabric which is formed from at least a first fabric layer and a second fabric layer. The fibers in both of the first and second fabric layers comprise high tenacity fibers, and the layers are bonded together.

For the purposes of the present invention, a fiber is an elongate body the length dimension of which is much greater that the transverse dimensions of width and thickness. Accordingly, the term "fiber" includes monofilament, multifilament, ribbon, strip, staple and other forms of chopped, cut or discontinuous fiber and the like having regular or irregular cross-sections. The term "fiber" includes a plurality of any of the foregoing or a combination thereof. A yarn is a continuous strand comprised of many fibers or filaments. Fibers may also be in the form of split film or tape.

The cross-sections of fibers useful herein may vary widely. They may be circular, flat or oblong in cross-section. They may also be of irregular is or regular multi-lobal cross-section having one or more regular or irregular lobes projecting from the linear or longitudinal axis of the fibers. It is preferred that the fibers be of substantially circular, flat or oblong cross-section, most preferably circular.

As used herein, the term "high tenacity fibers" means fibers which have tenacities equal to or greater than about 7 g/d. Preferably, these fibers have initial tensile moduli of at least about 150 g/d and energies-to-break of at least about 8 J/g as measured by ASTM D2256. As used herein, the terms "initial tensile modulus", "tensile modulus" and "modulus" mean the modulus of elasticity as measured by ASTM 2256 for a yarn and by ASTM D638 for an elastomer or matrix material.

Preferably, the high tenacity fibers have tenacities equal to or greater than about 10 g/d, more preferably equal to or greater than about 16 g/d, even more preferably equal to or greater than about 22 g/d, and most preferably equal to or greater than about 28 g/d.

High strength fibers useful in the yarns and fabrics of the invention include highly oriented high molecular weight polyolefin fibers, particularly high modulus (or high tenacity)

polyethylene fibers and polypropylene fibers, aramid fibers, polybenzazole fibers such as polybenzoxazole (PBO) and polybenzothiazole (PBT), polyvinyl alcohol fibers, polyacrylonitrile fibers, liquid crystal copolyester fibers, polyamide fibers, polyester fibers, glass fibers, graphite fibers, carbon fibers, basalt or other mineral fibers, rigid rod polymer fibers, and mixtures and blends thereof. Preferred high strength fibers useful in this invention include polyolefin fibers (more preferably high tenacity polyethylene fibers), aramid fibers, polybenzazole fibers, graphite fibers, and mixtures and blends thereof. Most preferred are high tenacity polyethylene fibers and/or aramid fibers.

U.S. Pat. No. 4,457,985 generally discusses such high molecular weight polyethylene and polypropylene fibers, and the disclosure of this patent is hereby incorporated by reference to the extent that it is not inconsistent herewith. In the case of polyethylene, suitable fibers are those of weight average molecular weight of at least about 150,000, preferably at least about one million and more preferably between about two million and about five million. Such high molecular weight polyethylene fibers may be spun in solution (see U.S. Pat. No. 4,137,394 and U.S. Pat. No. 4,356,138), or a filament spun from a solution to form a gel structure (see U.S. Pat. No. 4,413,110, German Off. No. 3,004,699 and GB Patent No. 2051667), or the polyethylene fibers may be produced by a rolling and drawing process (see U.S. Pat. No. 5,702,657). As used herein, the term polyethylene means a predominantly linear polyethylene material that may contain minor amounts of chain branching or comonomers not exceeding about 5 modifying units per 100 main chain carbon atoms, and that may also contain admixed therewith not more than about 50 weight percent of one or more polymeric additives such as alkene-l-polymers, in particular low density polyethylene, polypropylene or polybutylene, copolymers containing mono-olefins as primary monomers, oxidized polyolefins, graft polyolefin copolymers and polyoxymethylenes, or low molecular weight additives such as antioxidants, lubricants, ultraviolet screening agents, colorants and the like which are commonly incorporated.

High tenacity polyethylene fibers (also referred to as extended chain or high molecular weight polyethylene fibers) are preferred and are available, for example, under the trademark SPECTRA® fibers and yarns from Honeywell International Inc. of Morristown, N.J., U.S.A.

Depending upon the formation technique, the draw ratio and temperatures, and other conditions, a variety of properties can be imparted to these fibers. The tenacity of the polyethylene fibers are at least about 7 g/d, preferably at least about 15 g/d, more preferably at least about 20 g/d, still to more preferably at least about 25 g/d and most preferably at least about 30 g/d. Similarly, the initial tensile modulus of the fibers, as measured by an Instron tensile testing machine, is preferably at least about 300 g/d, more preferably at least about 500 g/d, still more preferably at least about 1,000 g/d and most preferably at least about 1,200 g/d. These highest values for initial tensile modulus and tenacity are generally obtainable only by employing solution grown or gel spinning processes. Many of the filaments have melting points higher than the melting point of the polymer from which they were formed. Thus, for example, high molecular weight polyethylene of about 150,000, about one million and about two million molecular weight generally have melting points in the bulk of 138° C. The highly oriented polyethylene filaments made of these materials have melting points of from about 7° C. to about 13° C. higher. Thus, a slight increase in melting point reflects the crystalline perfection and higher crystalline orientation of the filaments as compared to the bulk polymer.

Preferably the polyethylene employed is a polyethylene having fewer than about one methyl group per thousand carbon atoms, more preferably fewer than about 0.5 methyl groups per thousand carbon atoms, and less than about 1 weight percent of other constituents.

Similarly, highly oriented high molecular weight polypropylene fibers of weight average molecular weight at least about 200,000, preferably at least about one million and more preferably at least about two million may be used. Such extended chain polypropylene may be formed into reasonably well oriented filaments by the techniques prescribed in the various references referred to above, and especially by the technique of U.S. Pat. No. 4,413,110. Since polypropylene is a much less crystalline material than polyethylene and contains pendant methyl groups, tenacity values achievable with polypropylene are generally substantially lower than the corresponding values for polyethylene. Accordingly, a suitable tenacity is preferably at least about 8 g/d, more preferably at least about 11 g/d. The initial tensile modulus for polypropylene is preferably at least about 160 g/d, more preferably at least about 200 g/d. The melting point of the polypropylene is generally raised several degrees by the orientation process, such that the polypropylene filament preferably has a main melting point of at least 168° C., more preferably at least 170° C. The particularly preferred ranges for the above described parameters can advantageously provide improved performance in the final article. Employing fibers having a weight average molecular weight of at least is about 200,000 coupled with the preferred ranges for the above-described parameters (modulus and tenacity) can provide advantageously improved performance in the final article.

In the case of extended chain polyethylene fibers, preparation and drawing of gel-spun polyethylene fibers are described in various publications, including U.S. Pat. Nos. 4,413,110; 4,430,383; 4,436,689; 4,536,536; 4,545,950; 4,551,296; 4,612,148; 4,617,233; 4,663,101; 5,032,338; 5,246,657; 5,286,435; 5,342,567; 5,578,374; 5,736,244; 5,741,451; 5,958,582; 5,972,498; 6,448,359; 6,969,553 and U.S. patent application publication 2005/0093200, the disclosures of which are expressly incorporated herein by reference to the extent not inconsistent herewith.

In the case of aramid fibers, suitable fibers formed from aromatic polyamides are described, for example, in U.S. Pat. No. 3,671,542, which is incorporated herein by reference to the extent not inconsistent herewith. Preferred aramid fibers will have a tenacity of at least about 20 g/d, an initial tensile modulus of at least about 400 g/d and an energy-to-break at least about 8 J/g, and particularly preferred aramid fibers will have a tenacity of at least about 20 g/d and an energy-to-break of at least about 20 J/g. Most preferred aramid fibers will have a tenacity of at least about 23 g/d, a modulus of at least about 500 g/d and an energy-to-break of at least about 30 J/g. For example, poly(p-phenylene terephthalamide) filaments which have moderately high moduli and tenacity values are particularly useful in forming ballistic resistant composites. Examples are Twaron® T2000 from Teijin which has a denier of 1000. Other examples are Kevlar® 29 which has 500 g/d and 22 g/d as values of initial tensile modulus and tenacity, respectively, as well as Kevlar® 129 and KM2 which are available in 400, 640 and 840 deniers from du Pont. Aramid fibers from other manufacturers can also be used in this to invention. Copolymers of poly(p-phenylene terephthalamide) may also be used, such as co-poly(p-phenylene terephthalamide 3,4' oxydiphenylene terephthalamide). Also useful in the practice of this invention are poly(m-phenylene isophthalamide) fibers sold by du Pont under the trade name Nomex®.

High molecular weight polyvinyl alcohol (PV-OH) fibers having high tensile modulus are described in U.S. Pat. No. 4,440,711 to Kwon et al., the disclosure of which is hereby incorporated by reference to the extent it is not inconsistent herewith. High molecular weight PV-OH fibers should have a weight average molecular weight of at least about 200,000. Particularly useful PV-OH fibers should have a modulus of at least about 300 g/d, a tenacity preferably at least about 10 g/d, more preferably at least about 14 g/d and most preferably at least about 17 g/d, and an energy to break of at least about 8 J/g. PV-OH fiber having such properties can be produced, for example, by the process disclosed in U.S. Pat. No. 4,599,267.

In the case of polyacrylonitrile (PAN), the PAN fiber should have a weight average molecular weight of at least about 400,000. Particularly useful PAN fiber should have a tenacity of preferably at least about 10 g/d and an energy to break of at least about 8 J/g. PAN fiber having a molecular weight of at least about 400,000, a tenacity of at least about 15 to 20 g/d and an energy to break of at least about 8 J/g is most useful; and such fibers are disclosed, for example, in U.S. Pat. No. 4,535,027.

Suitable liquid crystal copolyester fibers for the practice of this invention are disclosed, for example, in U.S. Pat. Nos. 3,975,487; 4,118,372 and 4,161,470. Liquid crystal copolyester fibers are available under the designation Vectran® fibers from Kuraray America Inc.

Suitable polybenzazole fibers for the practice of this invention are disclosed, for example, in U.S. Pat. Nos. 5,286,833, 5,296,185, 5,356,584, 5,534,205 and 6,040,050. Polybenzazole fibers are available under the designation Zylon® fibers from Toyobo Co.

Rigid rod fibers are disclosed, for example, in U.S. Pat. Nos. 5,674,969, 5,939,553, 5,945,537 and 6,040,478. Such fibers are available under the designation M5® fibers from Magellan Systems International.

Preferably, the fibers in the first fabric layer are selected from the group of high tenacity polyolefin fibers (more preferably high tenacity polyethylene fibers), aramid fibers, PBO fibers, graphite fibers and blends thereof. Likewise, the fibers in the second fabric layer are selected from the same group of fibers.

The fabric layers of this invention are preferably formed from all or substantially all high tenacity fibers. Alternatively, at least about 50% by weight of the fibers in the fabric layers are high tenacity fibers and more preferably at least about 75% by weight of the fibers in the fabric layers are high tenacity fibers.

The first fabric is in the form of a non-woven fabric of high tenacity unidirectionally oriented fibers. As is known, in such an arrangement the unidirectionally oriented fibers are aligned parallel to one another along a common fiber direction. The unidirectionally oriented fabric may include a minor amount of a material which provides some cross-directional stability to the product; such material may be in the form of fibers, yarns or adhesive yarns all of which are not high tenacity materials, or resins, adhesives, films and the like that may be spaced along the length of the unidirectionally oriented fabric but extend at an angle thereto. Such materials, if present, may comprise up to about 10%, more preferably up to about 5%, by weight of the total weight of the first fabric.

The first fabric layer may be constructed via a variety of methods. Preferably, yarn bundles of the high tenacity filaments are supplied from a creel and led through guides and into a collimating comb. The collimating comb aligns the filaments coplanarly and in a substantially unidirectional fashion. The fibers may then be led into one or more spreader bars which may be included in the coating apparatus, or may be located before or after the coating apparatus.

The high tenacity fiber network of unidirectionally oriented fibers forming the first fabric is coated with a matrix resin composition. As used herein, the term "coating" is used in a broad sense to describe a fiber network wherein the individual fibers either have a continuous layer of the matrix composition surrounding the fibers or a discontinuous layer of the matrix composition on the surfaced of the fibers. In the former case, it can be said that the fibers are fully embedded in the matrix composition. The terms coating and impregnating are interchangeably used herein.

Heretofore, in forming such unidirectionally oriented fabric either before or after coating with the resin matrix the unidirectional fabric was supported by a carrier web, such as a release paper or a film substrate. Such previous methods are described, for example, in U.S. Pat. Nos. 5,552,208 and 6,642,159, the disclosures of which are expressly incorporated herein by reference to the extent not inconsistent herewith. In such a process, the carrier web is eventually stripped away from the unidirectionally oriented fabric and is discarded.

In accordance with the present invention, preferably after coating the unidirectionally oriented fibers with the matrix resin, the first fabric is supported by means of the second fabric which may be in roll form; alternatively, the first fabric may be supported prior to or during the coating step. The second fabric may be fed beneath the first fabric such that one surface of the second fabric comes in contact with one surface of the first fabric, in a manner shown, for example, in the aforementioned U.S. Pat. No. 6,642,159 except that the carrier web is the second fabric material. That is, the second fabric layer is attached to the first fabric layer after coating of the first fabric layer. Alternatively, the second fabric layer may be in contact with and/or support the first fabric layer before the coating step and both fabric layers are then coated in the coating step, such as shown, for example, in the aforementioned U.S. Pat. No. 5,552,208.

In one embodiment of the process of this invention, the unidirectionally oriented fibers of the first fabric are first coated with the desired matrix resin. After coating, preferably the excess matrix resin in the first fabric layer is squeezed out, such as by means of a pair of rollers. Thereafter, the coated first fabric is placed on the second fabric. Both fabrics are then consolidated and are either allowed to cool or are heated, whereby matrix resin from the first fabric bonds at least the contacting surface of the second fabric to the first fabric to thereby form a unitary structure. By passing the combined fabric structure into an oven, the fabrics are dried.

It is preferred that the second fabric layer does not include a resin matrix prior to its contact with the coated first fabric such that the second fabric is at least partially penetrated by the matrix resin of the first fabric layer. Alternatively, the second fabric may be precoated with another matrix resin, preferably of the same or similar chemical structure, prior to contacting and supporting the first fabric layer. The layers are then laminated together, using heat and/or pressure. In this case, more preferably the same resin that is used as the matrix resin for the first fabric is also used for the second fabric.

Alternatively, either fabric layer may be totally impregnated with the matrix resin and then combined with the other fabric web, which could become saturated or just bonded at the surface, depending on the amount and viscosity of the resin.

The matrix resin composition may be applied as a solution, dispersion or emulsion, or the like, onto the fiber network that forms the first fabric layer. The matrix resin may be applied by any desired technique, such as by spraying, dipping, roller coating, hot melt coating, or the like. As mentioned above, the coated fabric layers may then be passed through an oven for drying in which they are subjected to sufficient heat to evaporate the water or other solvent in the matrix resin composition.

The second fabric layer is also formed from high tenacity fibers, but the fibers are oriented in multiple directions in the fabric. That is, the fibers in the second fabric are multi-directionally oriented. This means that there are sufficient fibers which extend in a second direction from the major direction of the fabric to provide some degree of cross direction strength to the fabric. The term "multi-directionally oriented fibers" is distinct from "unidirectionally oriented fibers".

The second fabric may be in the form of a woven fabric, a knitted fabric, a braided fabric, a felted fabric, a paper fabric, and the like. Preferably the second fabric is in the form of a woven fabric. This second fabric layer may be referred to as a ballistic textile product.

As mentioned above, the high tenacity fibers in the second fabric layer are chosen from the same group of fibers mentioned above with respect to the first fabric layer. Preferably, the fibers in the second fabric layer are also selected from the group of high tenacity polyolefin fibers (more preferably high tenacity polyethylene fibers), aramid fibers, PBO fibers, graphite fibers and blends thereof. Most preferably, such fibers are high tenacity polyethylene fibers and/or aramid fibers.

If a woven fabric is employed, it may be of any weave pattern, including plain weave, basket weave, twill, satin, three dimensional woven fabrics, and any of their several variations. Plain and basket weave fabrics are preferred and more preferred are such fabrics having an equal warp and weft count. In one embodiment as mentioned above, the woven fabric does not include a resin matrix. In another embodiment, the woven fabric may include a resin matrix prior to bonding to the first fabric.

The yarns of the woven fabric may be twisted, over-wrapped or entangled. The second fabric be woven with yarns having different fibers in the warp and weft directions, or in other directions. For example, a woven fabric may be formed with aramid fibers in the warp direction and high tenacity polyethylene fibers in the weft direction, or vice versa.

As mentioned above, the second fabric may alternatively be in the form of a knitted fabric. Knit structures are constructions composed of intermeshing loops, with the four major types being tricot, raschel, net and oriented structures. Due to the nature of the loop structure, knits of the first three categories are not as suitable as they do not take full advantage of the strength of a fiber. Oriented knitted structures, however, use straight inlaid yarns held in place by fine denier knitted stitches. The yarns are absolutely straight without the crimp effect found in woven fabrics due to the interlacing effect on the yarns. These laid in yarns can be oriented in a monoaxial, biaxial or multiaxial direction depending on the engineered requirements. It is preferred that the specific knit equipment used in laying in the load bearing yarns is such that the yarns are not pierced through.

The second fabric may alternatively be formed from a non-woven fabric such as a fabric in the form of a felt, such as needle punched felts. A felt is a non-woven network of randomly oriented fibers, preferably at least one of which is a discontinuous fiber, preferably a staple fiber having a length ranging from about 0.25 inch (0.64 cm) to about 10 inches (25 cm). These felts may be formed by several techniques known in the art, such as by carding or fluid laying, melt blowing and spin laying. The network of fibers is consolidated mechanically such as by needle punching, stitch-bonding, hydro-entanglement, air entanglement, spun bond, spun lace or the like, chemically such as with an adhesive, or thermally with a fiber to point bond or a blended fiber with a lower melting point.

Alternatively, the second fabric may be in the form of a paper fabric that may be formed, for example, by pulping a liquid containing the high tenacity fibers.

In another embodiment, the second fabric may be in the form of a multilayer composite fabric, such as a fabric that includes a third layer which may be a unidirectionally oriented fabric or a multi-directionally oriented fabric. The third layer is also preferably formed from high tenacity fibers.

The yarns useful in the various fibrous layers may be of any suitable denier, and may be of the same or different deniers in each layer. For example, the yarns may have a denier of from about 50 to about 3000. The selection is governed by considerations of ballistic effectiveness, other desired properties, and cost. For woven fabrics, finer yarns are more costly to manufacture and to weave, but can produce greater ballistic effectiveness per unit weight. The yarns are preferably from about 200 denier to about 3000 denier. More preferably, the yarns are from about 400 denier to about 2000 denier. Most preferably, the yarns are from about 500 denier to about 1600 denier.

The resin matrix for the fiber plies may be formed from a wide variety of thermoplastic, thermosetting or elastomeric materials having desired characteristics. In one embodiment, the elastomeric materials used in such matrix possess initial tensile modulus (modulus of elasticity) equal to or less than about 6,000 psi (41.4 MPa) as measured by ASTM D638. More preferably, the elastomer has initial tensile modulus equal to or less than about 2,400 psi (16.5 MPa). Most preferably, the elastomeric material has initial tensile modulus equal to or less than about 1,200 psi (8.23 MPa). These resinous materials are typically thermoplastic in nature.

Alternatively, the resin matrix may be selected to have a high tensile modulus when cured, as at least about $1\times10^5$ psi (690 MPa). Examples of such materials are disclosed, for example, in U.S. Pat. No. 6,642,159, the disclosure of which is expressly incorporated herein by reference to the extent not inconsistent herewith.

The proportion of the resin matrix material to fiber in the composite layers may vary widely depending upon the end use. The resin matrix material preferably forms about 1 to about 98 percent by weight, more preferably from about 5 to about 95 percent by weight, and still more preferably from about 5 to about 40 percent by weight, and most preferably from about 10 to about 25 percent by weight, based on the total weight of the fibers and resin matrix.

A wide variety of elastomeric materials may be utilized as the resin matrix. For example, any of the following materials may be employed: polybutadiene, polyisoprene, natural rubber, ethylene-propylene copolymers, ethylene-propylene-diene terpolymers, polysulfide polymers, polyurethane elastomers, chlorosulfonated polyethylene, polychloroprene, plasticized polyvinylchloride using dioctyl phthalate or other plasticizers well known in the art, butadiene acrylonitrile elastomers, poly (isobutylene-co-isoprene), polyacrylates, polyesters, polyethers, fluoroelastomers, silicone elastomers, thermoplastic elastomers, and copolymers of ethylene. Examples of thermosetting resins include those which are soluble in carbon-carbon saturated solvents such as methyl ethyl ketone, acetone, ethanol, methanol, isopropyl alcohol, cyclohexane, ethyl acetone, and combinations thereof. Among the thermosetting resins are vinyl esters, styrene-butadiene block copolymers, diallyl phthalate, phenol formaldehyde, polyvinyl butyral and mixtures thereof, as disclosed in the aforementioned U.S. Pat. No. 6,642,159. Preferred thermosetting resins for polyethylene fiber fabrics include at least one vinyl ester, diallyl phthalate, and optionally a catalyst for curing the vinyl ester resin.

One preferred group of materials for polyethylene fiber fabrics are block copolymers of conjugated dienes and vinyl aromatic copolymers. Butadiene and isoprene are preferred conjugated diene elastomers. Styrene, vinyl toluene and t-butyl styrene are preferred conjugated aromatic monomers. Block copolymers incorporating polyisoprene and/or polybutadiene may be hydrogenated to produce thermoplastic elastomers having saturated hydrocarbon elastomer segments. The polymers may be simple tri-block copolymers of the type $R—(BA)_x$ ($x=3-150$); wherein A is a block from a polyvinyl aromatic monomer and B is a block from a conjugated diene elastomer, or an A-B-A type of elastomer. A preferred resin matrix is an styrene-isoprene-styrene block copolymer, such as Kraton® D1107 styrene-isoprene-styrene block copolymer available from Kraton Polymer LLC.

One preferred matrix resin for aramid fibers is a polyurethane resin, to such as a water based polyurethane resin.

In one preferred embodiment, the matrix resin is chosen such that the composite fabric is flexible, and is useful in such applications as soft armor products and the like.

Following bonding of the first fabric and second fabrics together, they are preferably wound up in a roll. A separator sheet may be employed to keep the layers from sticking together during winding.

As mentioned above, additional layers may be incorporated in the composite fabric of the invention. For example, a three layered structure may be formed by incorporating another unidirectionally oriented fabric of high tenacity fibers. This additional layer is bonded to the opposite surface of the second layer from the surface which is bonded to the first layer. The additional unidirectionally oriented fabric may be combined with the other fabric layers at the same time that the other fabric layers are combined, or this third fabric layer may be preattached to the second fabric layer or combined therewith after bonding of the first and second fabric layers. For example, after forming a structure of the first and second fabrics, the composite structure can again be used to support another unidirectionally oriented fabric of high tenacity fibers, with the second fabric layer supporting the second unidirectionally oriented fabric layer. As an example, the first formed composite fabric can be positioned beneath the second unidirectionally oriented fabric with the multi-directionally oriented fabric being adjacent to a surface of the second unidirectionally oriented fabric, and the matrix resin of the second unidirectionally oriented fabric can be pressed against or into the multi-directionally oriented fabric. The resultant structure includes the second multi-directionally oriented fabrics sandwiched between two unidirectionally oriented fabrics.

Likewise, another multi-directionally oriented fabric (e.g., a woven fabric) may be combined with the first and second fabrics such that it is bonded to the surface of the unidirectionally oriented first fabric that is not to attached to the second fabric. In this manner, the first unidirectionally oriented fabric layer is sandwiched between two multi-directionally oriented fabrics.

In each of these three layered structures, the high tenacity fibers in each fabric may be the same or different from the fibers in the other fabric layers. Also, the matrix resin, when present, in each of the fabric layers is preferably the same or substantially the same chemically. Alternatively, the matrix resins of different fabric layers may be different but should be compatible so that the desired bonding of the layers can be achieved.

In another embodiment of the invention, a four layer fabric construction may be formed from two unidirectionally oriented fabric layers and two multi-directionally oriented fabric layers. For example, two woven fabric layers may be bonded together and form the internal fabric layers of the composite structure, with two unidirectionally oriented fabric layers forming the outer layers of the structure.

Alternatively, a four layer structure may be provided by suitably bonding two composite fabric structures each formed from a first and second fabric as described above, with the structures being bonded such that either the two of the same type of fabric layers are bonded together or two different types of fabric layers are bonded together.

Regardless of the number of fabric layers in the composite fabric structure, the composite fabric is formed by consolidation of the various layers. By "consolidating" is meant that the matrix material and the fibers are combined into a unitary layer. Consolidation can occur by means of drying, cooling, heating, pressure or a combination thereof.

An article may be formed from a number of layers of the composite fabric structure (whether it be a two layer structure, a three layer structure, a four layer structure, or a structure with additional layers). The number of layers of the composite fabric structure that are present in such an article depends upon a variety of factors, including the type of application, desired weight, etc. For example, in a ballistic resistant article such as a vest, the number of layers of the two fabric composite structure may range from about 2 to about 60, more preferably from about 8 to about 50, and most preferably from about 10 to about 40. Such layers may be combined without bonding the several layers together in a conventional manner, such as by stitching only along the edge. To form such an article, the composite fabric can be cut into the desired shape.

When several layers of the composite fabrics containing unidirectionally oriented fibers are employed, the unidirectionally oriented fabrics are preferably disposed at an angle with respect to each other (e.g., cross-plied). Such angles may be about 0°/90°, or any other desired angle.

Various configurations of the composite fabric can be made based on the desired application, ballistic threat and desirable properties such as flame retardancy, durability and water repellency, among others. For example, one can use aramid materials for both the supporting multi-directionally oriented fabric layer and the unidirectional fabric layer, or high tenacity polyethylene fibers for both such fabric layers. Alternatively, the high tenacity polyethylene fibers and aramid fibers may be combined in any desired combination, such as the first fabric being an aramid fabric and the second fabric being a high tenacity polyethylene fabric, or the first fabric being a high tenacity polyethylene fabric and the second fabric being an aramid fabric. In another embodiment, a graphite unidirectionally oriented fabric may be attached to a high tenacity polyethylene fiber woven fabric, or a PBO unidirectional fabric may be attached to an aramid woven fabric. These materials could arranged in any desired configuration.

One or more plastic films can be included in the composite to permit different composite layers to slide over each other, such as for ease of forming into a body shape and ease of wearing, or for other reasons. These plastic films may typically be adhered to one or both surfaces of the composite fabric. Any suitable plastic film may be employed, such as films made of polyolefins. Examples of such films are linear low density polyethylene (LLDPE) films, ultrahigh molecular weight polyethylene (UHMWPE) films, polyester films, nylon films, polycarbonate films and the like. These films may be of any desirable thickness. Typical thicknesses is range from about 0.1 to about 1.2 mils (2.5 to 30 µm), more preferably from about 0.2 to about 1 mil (5 to 25 µm), and most preferably from about 0.2 to about 0.5 mils (5 to 12.5 µm). Most preferred are films of LLDPE.

Non-limiting embodiments of the invention include: a unidirectional non-woven fabric of high tenacity polyethylene yarns attached to a woven fabric of high tenacity polyethylene yarns; a unidirectional non-woven fabric of aramid yarns attached to a woven fabric of aramid yarns; a unidirectional non-woven fabric of high tenacity polyethylene yarns attached to a woven fabric of aramid yarns; a unidirectional non-woven fabric of aramid yarns attached to a woven fabric of high tenacity polyethylene yarns; and other structures with the same or different high tenacity fibers.

The composite fabrics of this invention can be used in a wide variety of applications, such as ballistic products, structural products, components in the automotive and aerospace industries, etc. Preferred applications are soft or hard armor products, such as bullet resistant body armor (vests and the like), vehicle panels, etc.

The following non-limiting examples are presented to provide a more complete understanding of the invention. The specific techniques, conditions, materials, proportions and reported data set forth to illustrate the principles of the invention are exemplary and should not be construed as limiting the scope of the invention.

EXAMPLES

Example 1

A composite is formed from layers of unidirectionally oriented aramid fibers and an aramid woven fabric. Aramid yarns of 1000 denier is fed from a creel and passes through a combing station to form a unidirectional fiber network. The unidirectional fabric weighs 45 g/m$^2$ before coating. The yarns pass into a tank containing a solution of a polyurethane matrix resin which impregnates into the unidirectional fabric. The coated unidirectional fabric next passes through a pair of rollers to squeeze out excess matrix resin solution and spread the matrix solution substantially uniformly among and between the filaments. The resin pick up is about 16 weight percent, based on the total weight of the coated fabric.

The coated unidirectional fabric is then placed on a dry aramid woven fabric (containing no matrix resin) that is fed from a separate roll. The woven fabric is a plain weave scoured fabric of 840 denier aramid yarns weighing 7 oz/square yard (237.4 g/m$^2$). The woven fabric is fed onto the bottom of the unidirectional fabric layer and acts as a support therefor. The combined structure is fed into a pair of nip rolls which controls the thickness of the composite fabric and causes the matrix resin from the unidirectional non-woven fabric to at least contact the adjacent surface of the woven fabric. The combined structure is then passed into a drying oven where the matrix resin solvent volatilizes. The consolidated composite fabric is wound up into a continuous roll.

Samples of the composite fabric measuring 18×18 inches (45.7×45.7 cm) are tested for ballistic resistance with a shoot pack weighing 1.00 psf (4.88 kg/m$^2$) against both 9 mm full metal jacket (FMJ) 124 grain bullets and 17 grain, 22 caliber, FSP hardened fragment simulators. It is found that the ballistic properties of the material are acceptable for ballistic resistant articles.

Example 2

Example 1 is repeated except that the unidirectional non-woven fabric is formed from 1300 denier high tenacity polyethylene yarns (Spectra® 1000 from Honeywell International Inc.), with the unidirectional fiber matrix weighing 53 g/m$^2$ (before coating). The matrix resin is a styrene-isoprene-styrene elastomer (Kraton® D1107). The woven fabric is a plain weave fabric of high tenacity polyethylene yarns (375 denier yarns of Spectra® 1000 fiber from Honeywell International Inc.). The resin pick up is about 16 weight percent, based on the total weight of the coated fabric.

When samples are tested as in Example 1, similar results are noted.

The process of the present invention is in contrast to current manufacturing processes wherein unidirectional tapes are produced mainly by using a substrate for providing the cross-directional strength during processing, for keeping the resin with the unidirectional fibers and for keeping the integrity of the unidirectional fibers during winding. In such method, the substrate is subsequently discarded and not used as an integral part of the finished product. This invention employs a second fabric in the form of a multi-directionally oriented fabric, such as a ballistic textile product, which has some level of cross-directional strength, to replace the discarded substrate with a product that will provide ballistic properties for the finished article. The product of this invention can be produced by a process which reduces the cost of manufacture of the material and the product has acceptable if not improved ballistic performance.

With this invention it is possible to reduce the amount of resin in the composite structure, which can result in higher ballistic performance per unit weight of the ballistic structure, such as a vest. The cost of the composite material can be lower and the number of layers required to produce armor products and the like can also be reduced.

Having thus described the invention in rather full detail, it will be understood that such detail need not be strictly adhered to but that further changes and modifications may suggest themselves to one skilled in the art, all falling within the scope of the invention as defined by the subjoined claims.

What is claimed is:

1. A multilayered composite fabric, said composite fabric comprising:
   (a) a first fabric comprising non-woven unidirectionally oriented fibers in a first resin matrix, the first resin matrix surrounding the fibers, said fibers comprising high tenacity fibers, said first fabric comprising first and second surfaces; and
   (b) a second fabric comprising multi-directionally oriented fibers optionally in a second resin matrix, said second fabric comprising high tenacity fibers, said second fabric having first and second surfaces, said first surface of said second fabric being bonded to said second surface of said first fabric thereby forming said composite fabric.

2. The composite fabric of claim 1 wherein said second fabric comprises a fabric selected from the group consisting of woven fabrics, knitted fabrics, braided fabrics, felted fabrics, and paper fabrics.

3. The composite fabric of claim 1 wherein said first and second fabrics are bonded at least by the resin of said first resin matrix.

4. The composite fabric of claim 1 wherein said first and second fabrics are bonded by the resins of said first resin matrix and said second resin matrix, and the resins in said first resin matrix and said second resin matrix are chemically the same.

5. The composite fabric of claim 1 wherein said high tenacity fibers of said first fabric and said second fabric are selected from the group consisting of polyolefin fibers, aramid fibers, polybenzazole fibers, polyvinyl alcohol fibers, polyacrylonitrile fibers, liquid crystal copolyester fibers, polyamide fibers, polyester fibers, glass fibers, graphite fibers, carbon fibers, basalt or other mineral fibers, rigid rod polymer fibers, and blends thereof.

6. The composite fabric of claim 1 wherein said high tenacity fibers of said first fabric and of said second fabric are selected from the group consisting of high tenacity polyethylene fibers, aramid fibers, PBO fibers, graphite fibers, and blends thereof.

7. The composite fabric of claim 1 wherein said high tenacity fibers of said first fabric and said second fabric comprise high tenacity polyethylene fibers and/or aramid fibers.

8. The composite fabric of claim 7 wherein said high tenacity fibers of said first fabric are chemically the same as the high tenacity fibers of said second fabric.

9. The composite fabric of claim 1 wherein said second fabric is in the form of a woven fabric.

10. The composite fabric of claim 1 wherein said high tenacity fibers of said first fabric comprise aramid fibers and said high tenacity fibers of said second fabric comprise aramid fibers.

11. The composite fabric of claim 10 wherein said second fabric is in the form of a woven fabric.

12. The composite fabric of claim 1 further comprising a third fabric, said third fabric comprising non-woven unidirectionally oriented high tenacity fibers in a third resin matrix, said third fabric having first and second surfaces, said first surface of said third fabric being bonded to said second surface of said second fabric whereby second fabric is disposed between said first fabric and said third fabric.

13. The composite fabric of claim 1 further comprising third and fourth fabrics, said third fabric comprising multi-directionally oriented high tenacity fibers optionally in a third resin matrix, said third fabric having first and second surfaces, said first surface of said third fabric being bonded to said second surface of said second fabric, said fourth fabric comprising non-woven unidirectionally oriented high tenacity fibers in a fourth resin matrix, said fourth fabric having first and second surfaces, said first surface of said fourth fabric being bonded to said second surface of said third fabric.

14. The composite fabric of claim 1 further comprising a third fabric comprising multi-directionally oriented high tenacity fibers optionally in a third resin matrix, said third fabric having first and second surfaces, said first surface of said third fabric being bonded to said first surface of said first fabric whereby first fabric is disposed between said second fabric and said third fabric.

15. The composite of claim 1 further comprising third and fourth fabrics, said third fabric comprising non-woven unidirectionally oriented high tenacity fibers in a third resin matrix, said third fabric having first and second surfaces, said first surface of said third fabric being bonded to said second surface of said second fabric, said fourth fabric comprising multi-directionally oriented high tenacity fibers optionally in a fourth resin matrix, said fourth fabric having first and second surfaces, said first surface of said fourth fabric being bonded to said second surface of said third fabric.

16. The composite fabric of claim 1 further comprising at least one plastic film attached to at least one of said first and second fabrics.

17. A ballistic article comprising the multilayered composite fabric of claim 1.

18. In a method of forming a composite fabric structure from high tenacity fibers, the improvement comprising:
    (a) forming a first fabric comprising non-woven unidirectionally oriented fibers, said fibers comprising high tenacity fibers;
    (b) supporting said first fabric with a second fabric comprising multi-directionally oriented fibers, said second fabric comprising high tenacity fibers;
    (c) coating a first matrix resin onto said first fabric either before, after or while said first fabric is supported by said second fabric, such that said resin matrix extends from said first fabric and at least into said second fabric, and wherein the resin matrix surrounds the fibers of at least said first fabric; and
    (d) consolidating said first fabric and said second fabric into a composite fabric such that said first fabric and said second fabric are bonded together by means of said resin matrix, whereby said second fabric becomes an integral part of said composite fabric.

19. The method of claim 18 wherein said second fabric comprises a woven fabric.

20. The method of claim 19 wherein said high tenacity fibers of said first fabric and of said second fabric comprise high tenacity polyethylene fibers and/or aramid fibers.

21. A method of forming a composite fabric structure, said method comprising:
    (a) supplying a first fabric comprising non-woven unidirectionally oriented fibers in a first resin matrix, the first resin matrix surrounding the fibers, said fibers comprising high tenacity fibers, said first fabric comprising first and second surfaces;
    (b) supplying a second fabric comprising multi-directionally oriented fibers optionally in a second resin matrix, said second fabric comprising high tenacity fibers, said second fabric having first and second surfaces; and
    (c) bonding said first surface of said second fabric to said second surface of said first fabric to thereby form said composite fabric.

22. The method of claim 21 wherein said second fabric comprises a woven fabric.

23. The method of claim 21 wherein said high tenacity fibers of said first fabric and of said second fabric comprise high tenacity polyethylene fibers and/or aramid fibers.

* * * * *